US007515237B2

(12) United States Patent
Park et al.

(10) Patent No.: US 7,515,237 B2
(45) Date of Patent: Apr. 7, 2009

(54) LIQUID CRYSTAL DISPLAY DEVICE WITH HIGH APERTURE RATIO HAVING A METAL LAYER AND A STORAGE ELECTRODE ENTIRELY OVERLAPPED WITH A COMMON ELECTRODE

(75) Inventors: Seung Ryull Park, Gyeonggi-do (KR); Dong Guk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 448 days.

(21) Appl. No.: 11/166,094

(22) Filed: Jun. 27, 2005

(65) Prior Publication Data
US 2006/0125989 A1 Jun. 15, 2006

(30) Foreign Application Priority Data
Dec. 13, 2004 (KR) .................... 10-2004-0105113

(51) Int. Cl.
*G02F 1/1343* (2006.01)
(52) U.S. Cl. .................................. 349/141; 349/38
(58) Field of Classification Search ................ 349/141, 349/38
See application file for complete search history.

(56) References Cited
U.S. PATENT DOCUMENTS

| | | | | |
|---|---|---|---|---|
| 6,259,502 B1* | 7/2001 | Komatsu | .................... | 349/141 |
| 6,445,435 B1* | 9/2002 | Seo et al. | .................... | 349/141 |
| 2003/0107037 A1* | 6/2003 | Youn et al. | .................... | 257/59 |
| 2003/0107696 A1* | 6/2003 | Song | .................... | 349/141 |
| 2004/0109121 A1* | 6/2004 | Cho et al. | .................... | 349/141 |
| 2004/0160560 A1* | 8/2004 | Kim et al. | .................... | 349/129 |
| 2005/0083467 A1* | 4/2005 | Lee et al. | .................... | 349/141 |
| 2005/0280748 A1* | 12/2005 | Ochiai et al. | .................... | 349/43 |

* cited by examiner

*Primary Examiner*—Andrew Schechter
*Assistant Examiner*—Paisley L Arendt
(74) *Attorney, Agent, or Firm*—McKenna Long & Aldridge LLP

(57) ABSTRACT

Disclosed is an in-plane switching (IPS) mode liquid crystal display (LCD) device having an increased aperture ratio by overlapping a storage capacitor on a lower end of an electrode. The (IPS) mode liquid crystal display device (LCD) device includes first and second substrates; a gate line and a data line arranged horizontally and vertically to define a plurality of pixel regions on the first substrate; a switching device, having a gate electrode, a semiconductor layer and source and drain electrodes, at a crossing of the gate line and the data line; a passivation film on an entire surface of the first substrate including the switching device; a common electrode and a pixel electrode alternately disposed at an upper portion of the passivation film and generating an in-plane electric field, wherein at least one of the common and pixel electrodes has a first storage capacitor at its lower end; and a liquid crystal layer between the first and second substrates.

18 Claims, 7 Drawing Sheets

LIQUID CRYSTAL DISPLAY DEVICE WITH HIGH APERTURE RATIO HAVING A METAL LAYER AND A STORAGE ELECTRODE ENTIRELY OVERLAPPED WITH A COMMON ELECTRODE

This application claims the benefit of Korean Patent Application No. 2004-105113, filed on Dec. 13, 2004, which is hereby incorporated by reference for all purposes as if fully set forth herein.

BACKGROUND OF THE INVENTION

1. Field of the Invention

The present invention relates to a high aperture ratio liquid crystal display (LCD) device. More particularly, the present invention relates to an in-plane switching (IPS) mode LCD capable of enhancing an aperture ratio by forming a storage capacitor, namely, a light blocking region, to overlap with a lower end of at least one electrode.

2. Description of the Related Art

As the demand for various information display devices is increasing, research for a flat panel display device such as an LCD (Liquid Crystal Display), PDP (Plasma Display Panel), an ELD (Electro Luminescent Display), an FED (Field Emission Display) or a VFD (Vacuum Fluorescent Display) is actively ongoing. Of these displays, the LCD is the most spotlighted because of its implementation of high picture quality, mass-production techniques, ease of a driving unit, light weight and thinness, and low power consumption.

The LCD device is a display device for displaying a desired image by controlling a light transmittance of a liquid crystal layer by pixels arranged in a matrix form by separately applying a data signal according to picture information of each pixel. The LCD device is commonly driven by an AM (Active Matrix) method. The AM method is a method in which a switching device such as a thin film transistor (TFT) is added in each pixel to apply a voltage to liquid crystal of each pixel in order to drive the liquid crystal.

The LCD device can be divided into various types of display mode LCD device based on how the liquid crystal molecules are driven. Among the various types of display modes, a TN (Twisted Nematic) mode LCD device has been commonly used.

The TN mode LCD device, turns on/off an electric field perpendicular to a substrate to drive liquid crystal molecules so that a director of liquid crystal can have an angle between 0° and 90° to a substrate. The TN mode LCD device has advantages of an easy black and white display function, a high speed response and a low driving voltage.

However, since the TN mode LCD device drives liquid crystal molecules to be vertical to the substrate, its viewing angle characteristics are not good. In particular, it has viewing angle dependence such that a screen color or brightness of an image changes based on a direction or an angle in or at which a user looks at a screen of the LCD device. Thus, in an effort to overcome such shortcomings, an in-plane switching (IPS) mode LCD device for driving liquid crystal to be driven in a state that a director is horizontal to the substrate is being actively studied.

In the IPS mode LCD device, when a voltage is applied to an electrode, an in-plane electric field, namely, a field having a direction parallel to the substrate, is formed to align liquid crystal molecules horizontal to the substrate to obtain wide viewing angle characteristics compared with an existing viewing angle. FIG. 1 is a schematic view of the IPS mode LCD device.

As shown, on an array substrate of the IPS mode LCD device, a gate line 1 and a data line 3 are arranged horizontally and vertically, respectively, to define a pixel region. In the pixel region, at least a pair of common electrodes 6a and 6b for switching liquid crystal molecules and a pixel electrode 7 are disposed in an alternating pattern substantially parallel to the data line 3 to generate an In-plane electric field on the array substrate.

A switching device, namely, a thin film transistor (TFT 9), which includes a gate electrode 1a, a semiconductor layer (not shown) and source and drain electrodes 2a and 2b is formed at the crossing of the gate line 1 and the data line 3, transfers a data signal to the pixel electrode 7 to switch liquid crystal molecules. The pixel electrode 7 is electrically connected with the storage electrode 13 extendedly formed from the drain electrode 2b through a first contact hole 11 to receive a signal. Also, in the pixel region, a common line 4 is formed parallel with the gate line 1 to transfer a common signal to the common electrodes 6a and 6b.

The storage electrode 13 extendedly formed from the drain electrode 2b overlaps with the common line 4 with a gate insulation film (not shown) interposed therebetween, to form a storage capacitor.

As a result, in the IPS mode LCD device having the above-described structure, the common electrodes 6a and 6b and the pixel electrode 7 generate an in-plane electric field on the array substrate to drive liquid crystal molecules in a state of being parallel with the substrate, so that the viewing angle in the up/down and left/right direction can be considerably enhanced when the display unit of the LCD device is viewed from the front side, compared with the related art TN mode LCD device.

In the IPS mode LCD device, because the common electrodes 6a and 6b and the pixel electrode 7 are disposed on the same substrate, the aperture ratio and luminance are reduced compared with the related art TN mode LCD device.

The aperture ratio is determined by a region where light of a backlight unit made incident on the liquid crystal panel cannot pass through the liquid crystal panel, namely, an area of a light blocking region. In the related art TN mode LCD device, the light blocking region is determined by a line part of the gate line and the data line applying a signal voltage, the TFT part, an extra part for considering an alignment error in bonding upper and lower substrates of the liquid crystal panel, and the part of the storage capacitor. Comparatively, in the IPS mode LCD device, a part of the common electrodes and the pixel electrode is added as the light blocking region, which reduces the aperture ratio and luminance of the LCD device.

Although the common electrodes and the pixel electrodes are formed as transparent conductors in terms of increasing white luminance of the IPS mode LCD device, in-plane electric field is substantially generated at the edge of electrodes, so the central region of the electrodes does not help to increase the aperture ratio.

SUMMARY OF THE INVENTION

Accordingly, the present invention is directed to a liquid crystal display device with high aperture ratio that substantially obviates one or more of the problems due to limitations and disadvantages of the related art.

An advantage of the present invention is to provide an LCD (Liquid Crystal Display) device capable of reducing an area ratio assumed by a light blocking region in a unit pixel region and enhancing an aperture ratio by forming a storage capacitor, namely, a light blocking region, to overlap with a lower end of at least one electrode.

To achieve these and other advantages and in accordance with the purpose of the present invention, as embodied and broadly described herein, there is provided an in-plane switching (IPS) mode liquid crystal display (LCD) device including: first and second substrates; a gate line and a data line arranged horizontally and vertically to define a plurality of pixel regions on the first substrate; a switching device, having a gate electrode, a semiconductor layer and source and drain electrodes, at a crossing of the gate line and the data line; a passivation film on an entire surface of the first substrate including the switching device; a common electrode and a pixel electrode arranged in an alternating pattern at an upper portion of the passivation film, wherein an in-plane electric field is generated between the common and pixel electrodes and at least one of the common and pixel electrodes has a first storage capacitor at its lower end; and a liquid crystal layer between the first and second substrates.

In another aspect of the present invention, there is provided an in-plane switching (IPS) mode liquid crystal display (LCD) device including: first and second substrates; a gate line and a data line arranged horizontally and vertically to define a plurality of pixel regions on the first substrate; a switching device, having a gate electrode, a semiconductor layer and source and drain electrodes, at a crossing of the gate line and the data line; at least one metal layer on a same layer of the gate line; a first storage electrode overlapping the metal layer to form a first storage capacitor; a passivation film on an entire surface of the first substrate including the switching device and the first storage electrode; a common electrode and a pixel electrode arranged in an alternating pattern at an upper portion of the passivation film in the pixel region and generating an in-plane electric field, wherein at least one of the common and pixel electrodes has the first storage capacitor at its lower portion; and a liquid crystal layer formed between the first and second substrates.

In another aspect of the present invention, there is also provided a method for fabricating an in-plane switching (IPS) mode liquid crystal display (LCD) device including: preparing first and second substrates; forming at least one first storage capacitor on the first substrate; forming a passivation film on the first substrate with at least one first storage capacitor formed thereon; forming a common electrode and a pixel electrode at a region on the passivation film corresponding to the first storage capacitor; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE ILLUSTRATED EMBODIMENTS

An IPS mode LCD device with a high aperture ratio in accordance with the present invention will now be described with reference to the accompanying drawings.

Figure 1:
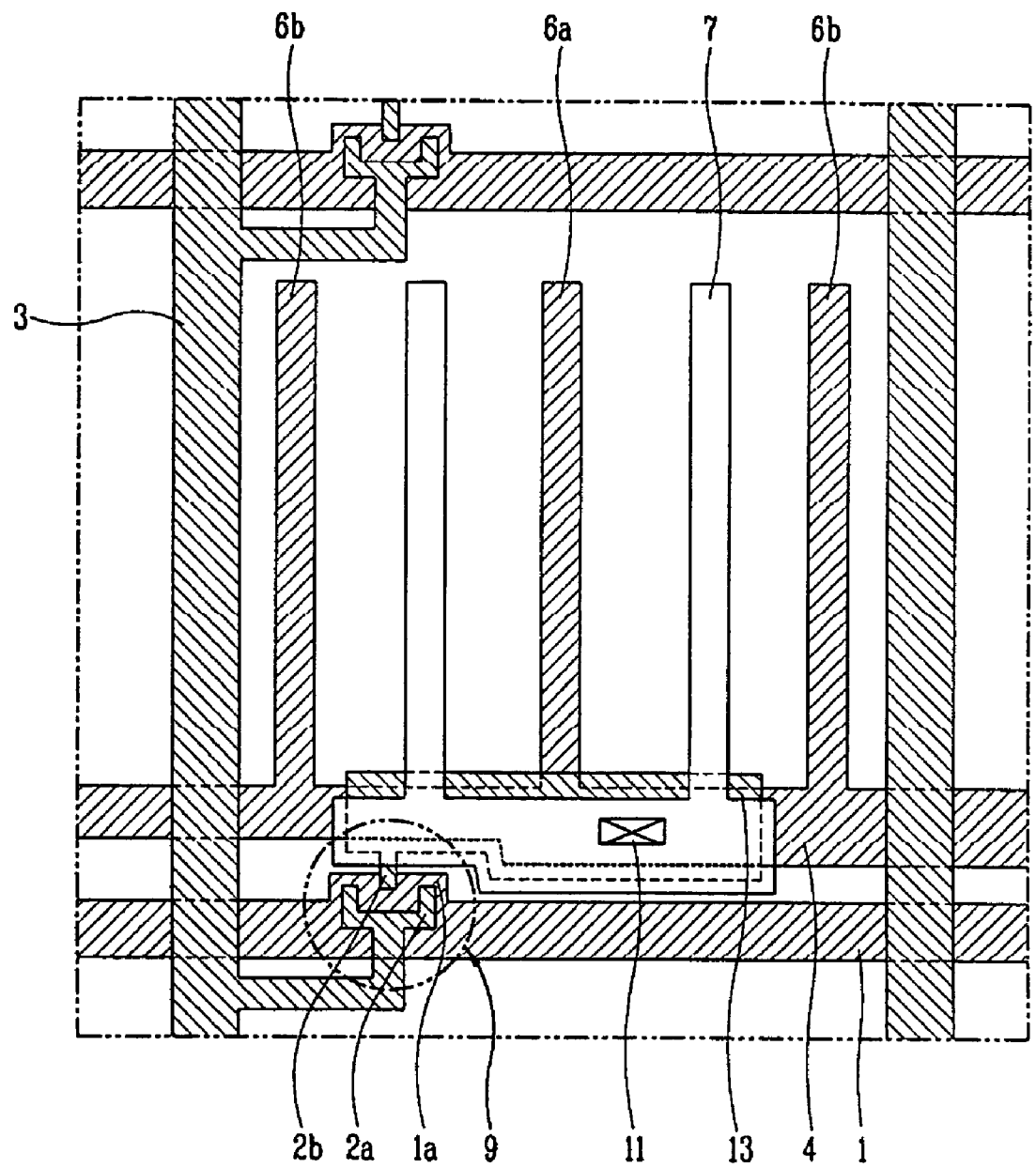
FIG. 1 is a plan view showing a unit pixel region of an in-plane switching (IPS) mode liquid crystal display (LCD) device in accordance with the related art.
Figure 2A:
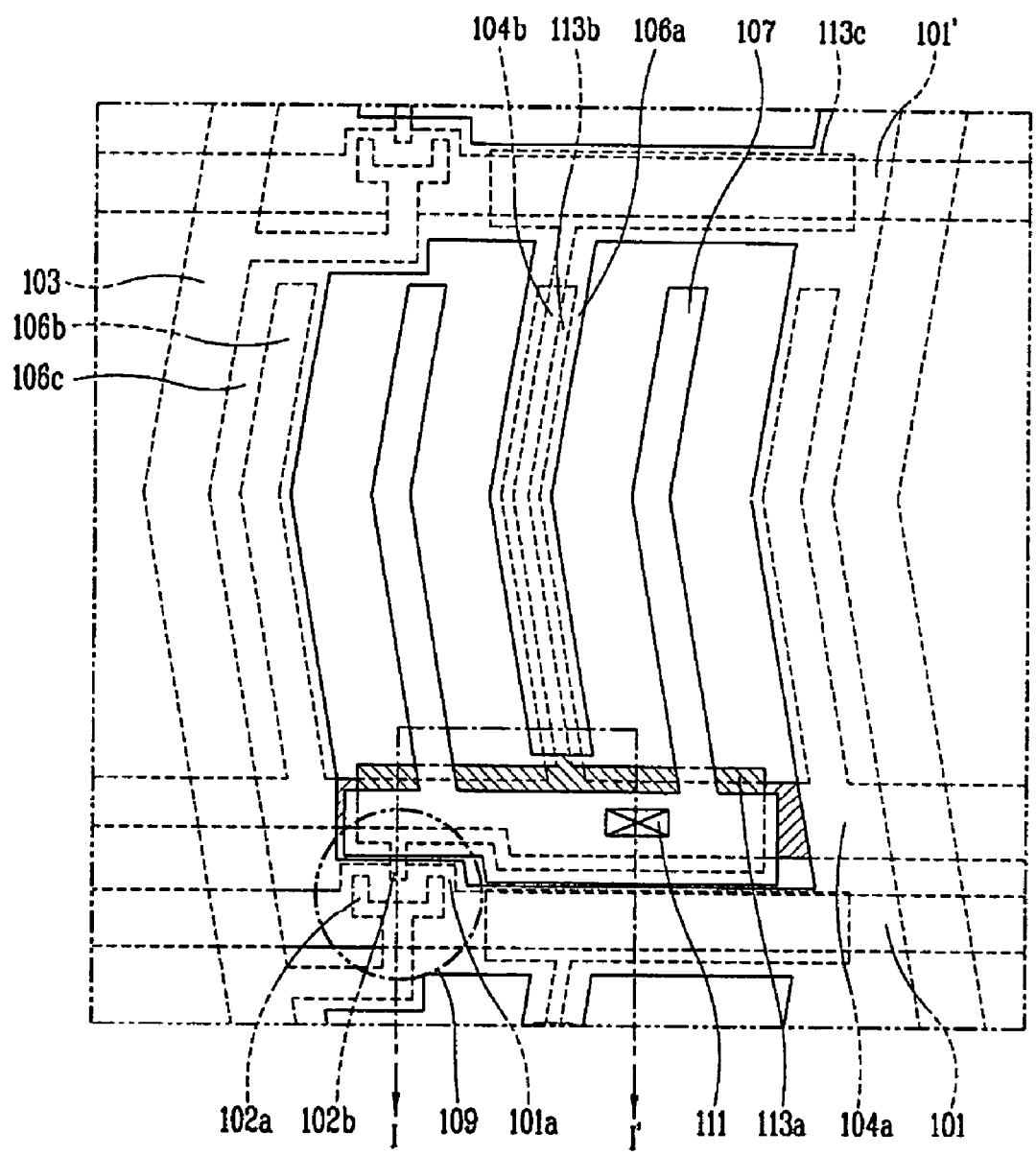
FIG. 2A is a plan view showing a unit pixel region of an IPS mode LCD device in accordance with an embodiment of the present invention.
Figure 2B:
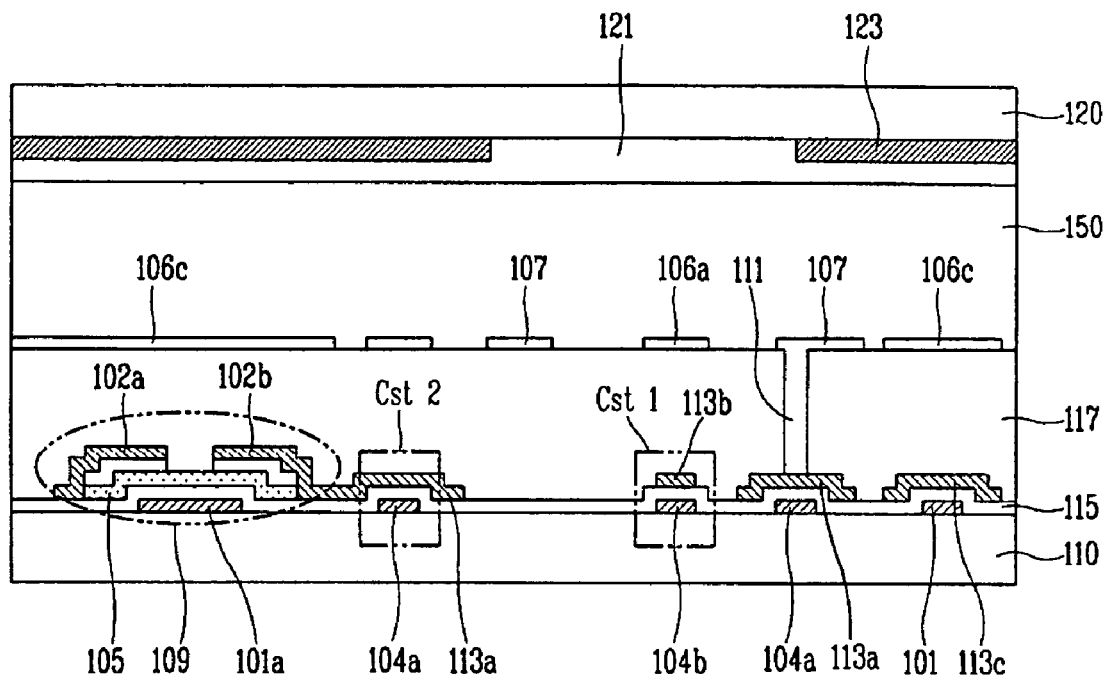
FIG. 2B is a sectional view taken along line I-I' of FIG. 2A.

FIG. 2A is a plan view showing a unit pixel region of an IPS mode LCD device in accordance with the present invention, and FIG. 2B is a sectional view taken along line I-I' of FIG. 2A.

As illustrated, a gate line 101 and a data line 103 are arranged horizontally and vertically on a first substrate 110 to define a pixel region, and at a crossing of the gate line 101 and the data line, there are formed a gate electrode 101a formed as a portion of the gate line 101, a semiconductor layer 105 formed on the gate electrode 101a and source and drain electrodes 102a and 102b disposed spaced apart from each other on the semiconductor layer 105 to form a switching device 109.

A passivation film 117 made of an organic insulation film with a low dielectric constant is deposited on the entire surface of the first substrate 110 including the gate line 101, the data line 103 and the switching device 109, on which at least a pair of common electrode 106a and pixel electrode 107 made of a transparent conductor of ITO (indium Tin Oxide), IZO (Indium Zinc Oxide), ITZO (Indium Tin Zinc Oxide) or TO (Tin Oxide) are alternately formed substantially parallel to each other to generate an in-plane electric field on the first substrate 110. The pixel electrode 107 receives a data signal of the drain electrode 102b through a first contact hole 111 formed on the passivation film 117.

A first storage capacitor Cst1 is formed at a lower end of the common electrode 106a.

As for the first storage capacitor Cst1, at least one metal layer 104b formed on the same layer as the gate line 101 and the first storage electrode 113b formed on the same layer as the data line 103 are disposed to overlap with each other with a gate insulation film 115 interposed therebetween. In this case, the metal layer 104b is formed by extending a portion of the common line 104a for transferring a common signal, and the first storage electrode 113b is formed by extending the drain electrode 102b made of a metal.

The first storage capacitor Cst1 charges a pixel voltage while a gate signal is being applied to the gate electrode 101a, and supplies the charged pixel voltage to the pixel electrode 107 until the next gate signal is applied, namely, until the switching device 109 of the next pixel is turned on again, so that flicker due to change of a voltage of the pixel electrode 107 can be prevented and alignment of liquid crystal can be maintained.

As mentioned above, the passivation film 117 is interposed between the first storage capacitor Cst1 and the common electrode 106 disposed at an upper portion of the first storage capacitor Cst1. The passivation film 117 is made of an organic insulation material with a low dielectric constant such as acrylic resin, BCB (Benzocyclobutene) and a polyimide resin in order to prevent formation of parasitic capacitance between the first storage capacitor Cst1 and the common electrode 106a. For the same reason, in the present invention, the first storage capacitor Cst1 can be formed at a lower end of the pixel electrode without limitation in its number as well as formed at the lower end of the common electrode.

In the pixel region in accordance with the present invention, besides the first storage capacitor Cst1 formed at the lower end of the electrode, second and third storage capacitors can be additionally formed. Namely, by overlapping a second storage electrode 113a formed as a portion of the drain electrode 102b extends at an upper portion of the common line 104a, to form the second storage capacitor Cst2 together with the common line 104a. In addition, by overlapping a third storage electrode 113c formed as a portion of the first storage electrode 113b extends with a gate line 101' of a neighbor pixel, to form the third storage capacitor. In this case, the third storage capacitor includes a previous gate line 101', so that when the previous gate line 101' is turned on, a storage capacitor of a pixel corresponding to the next gate line 101 can be charged in advance.

The first storage capacitor Cst1 is formed to be narrow in its width compared with the common electrode 106a (or the pixel electrode 107) disposed at its upper portion. In other words, the first storage electrode 113b and the metal layer 104b forming the first storage capacitor Cst1 are formed at a lower end of the central portion except for an edge region of the common electrode 106a. With this structure of the LCD device, an excellent screen contrast ratio can be implemented and degradation of the aperture ratio due to the area occupied by the storage capacitor in the pixel region can be minimized.

Figure 3A:
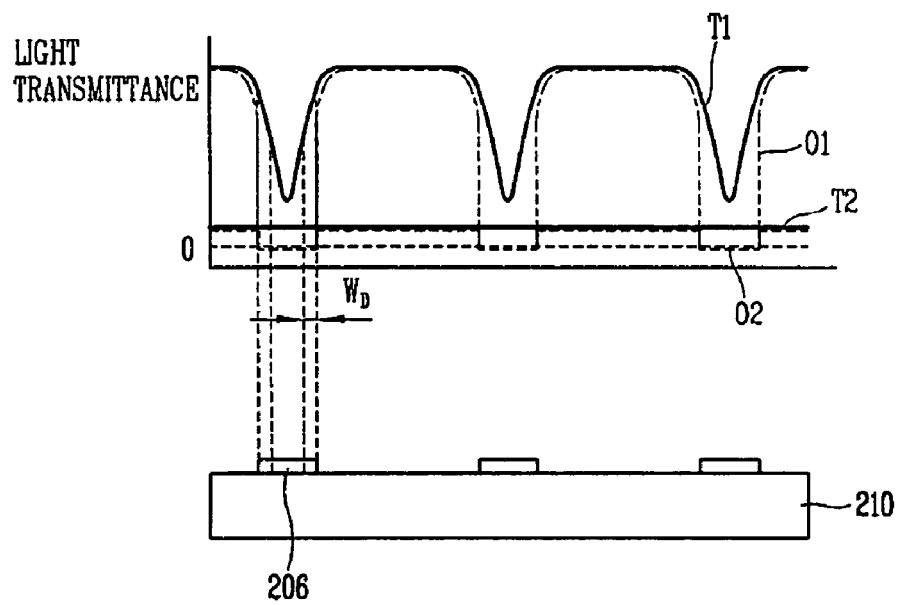
FIGS. 3A and 3B are graphs showing light transmittance characteristics according to an electrode formation material and an electrode structure of the LCD device in accordance with the present invention.
Figure 3B:
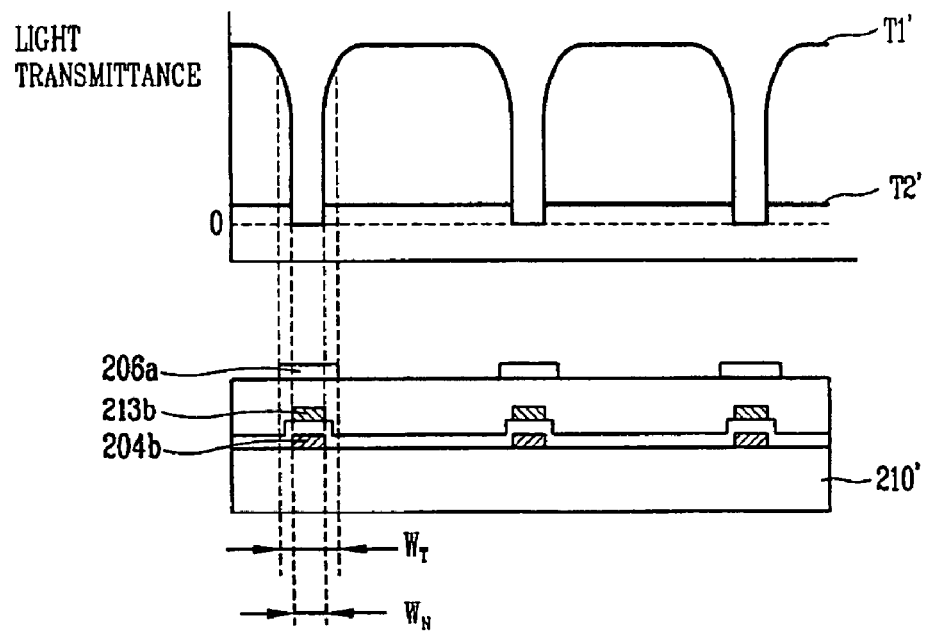

FIGS. 3A and 3B are graphs showing light transmittance characteristics according to electrode formation material and an electrode structure of the LCD device in accordance with the present invention.

FIG. 3A shows light transmittance in a normal white mode and a normal black mode for a case where all the electrodes 206 formed on the substrate 210 are made of a transparent conductor and for a case where all the electrodes 206 formed on the substrate 210 are made of an opaque conductor.

In FIG. 3A, solid lines T1 and T2 indicate, respectively, light transmittance in the normal white mode and in the normal black mode when the electrodes 206 are all made of the transparent conductor in the IPS mode LCD device, and dotted lines 01 and 02 indicate, respectively, light transmittance in the normal white mode and in the normal black mode when the electrodes 206 are all made of the opaque conductor (e.g., metal) in the IPS mode LCD device.

First, when the electrodes 206 formed on the substrate 210 are all made of the opaque conductor, light cannot be transmitted at the upper region of the electrode 206 in both normal black mode and normal white mode, resulting in the light transmittance 01 and 02 at the upper portion of the electrode 206 is 0. In comparison, when the electrodes 206 are all made of the transparent conductor, light is partially leaked at the upper portion of the electrode 206 in the normal black mode, failing to implement complete black luminance over the entire region of the substrate 210 including the electrode 206. Namely, in the case that the electrodes 206 are made of the transparent conductor, light transmittance T2 at the upper portion of the electrode 206 increases by a certain numerical value.

Meanwhile, in the normal white mode, liquid crystal is driven at a certain region of the upper portion of the electrode 206, a bit of light is transmitted to have a light transmittance T1 having a parabolic shape as shown in the drawing. Namely, black luminance and white luminance of the LCD device increase.

In this respect, however, it should be noted that a region for bettering the aperture ratio substantially in the normal white mode, among the entire area of the upper portion of the electrode 206, is limited to the edge portion (WD) of the electrode 206. In other words, the central portion of the electrode 206 except for the edge portion (WD) does not affect an increase of the white luminance and the aperture ratio. This is because in terms of the characteristics of the IPS mode LCD device, an in-plane electric field for driving liquid crystal is not substantially generated from the upper portion (especially at the central portion of the electrode) of the electrode. Thus, the central portion of the electrode works as a light blocking region.

Thus, by using the area of the central portion of the electrode, which is no better than the light blocking region, among the entire area of the electrode made of the transparent conductor, the first storage capacitor made of the opaque metal is disposed on the corresponding region, whereby the area occupied by the light blocking region in the unit pixel region can be reduced and the aperture ratio of the LCD device can be enhanced.

FIG. 3B shows light transmittance characteristics of each region of a substrate 210' when the first storage capacitor, namely, an opaque metal layer 204b and a first storage electrode 213b, are disposed at a lower side of an electrode 206a made of a transparent conductor in the IPS mode LCD device.

As illustrated, the edge portion (WN) (namely, the portion other than the central portion (WT) of the electrode 206a) of the transparent electrode 206a has a highly increasing light transmittance and has an enhanced aperture and luminance likewise in FIG. 3A. Meanwhile, at the central portion (WT) of the electrode 206a, namely, the corresponding region of the metal layer 204b and the first storage electrode 213b, each transmittance (T1' and T2') is 0 in the normal black mode and normal white mode, implementing the complete black luminance. Thus, a screen contrast ratio can be increased.

Actually, in a state that the factors for determining the aperture ratio in the unit pixel region, namely, the width of the gate line and the data line, the size of the TFT, the extra portion in consideration of an alignment error in bonding upper and lower substrates of the liquid crystal panel and the value of the storage capacitance, comparison between the aperture ratio of the LCD device of the present invention and that of the related art shows that the aperture ratio of the LCD device of the present invention is much higher than that of the related art.

That is, in the present invention, since the first storage capacitor is formed at the lower end of the central portion of the electrode, which substantially corresponds to the light blocking region, the advantages of the aperture ratio and luminance when the common electrode and the pixel electrode are made of the transparent conductor can be maintained, and in addition, since the storage capacitor, which corresponds to the light blocking region in the pixel region in the related art, overlaps with the lower end of the central portion of the electrode, that is, another light blocking region, the area occupied by the light blocking region in the pixel region can be reduced. Thus, a LCD device with a high aperture ratio can be obtained. By doing that, final luminance of the LCD device can be increased or power consumption of the LCD module for achieving the same final luminance can be reduced. In addition, the screen contrast ratio that can be obtained when the common electrode and the pixel electrode are made of an opaque conductor can be obtained.

Subsequently, with reference to FIGS. 2A and 2B, in the LCD device, a portion of a common line 104a extends to form a shielding line 106b along an edge portion of the unit pixel region. The shielding line 106b is disposed to be substantially parallel with the data line 103 to cut off a data signal of the data line 103. In this case, the shielding line 106b can have a wider width than the common electrode 106a formed at the center of the pixel in order to effectively prevent signal interference between the data line 103 and the pixel electrode 107.

The common electrode 106a and the pixel electrode 107 are formed in a '<' (bent) shape based on the extended direction of the gate line 101, and the data line 103 may also have the same '<' (bent) shape substantially parallel to the common electrode 106a and the pixel electrode 107. In this case, the common electrode 106a, the pixel electrode 107 and the data line 103 may have a '>' (bent) shape or a horizontally straight (short) line. The common electrode 106a and the pixel electrode 107 may be disposed to be substantially parallel with the gate line 101 and bent with respect to a longitudinal direction of the data line 103.

The transparent conductor forming the common electrode can extend to an upper portion of the gate line, the data line, the TFT and the shielding line to form a transparent conductor layer 106c, whereby signal distortion due to a residual voltage between the data line and the pixel electrode 107 can be prevented and light leakage to the upper portion of the gate line 101, the data line 103, the TFT 109 and the shielding line 106b can be prevented.

FIG. 2B shows the first substrate 110 as shown in FIG. 2A, the second substrate 120 corresponding to the first substrate 110 and a liquid crystal layer 150 formed between the first and second substrates 110 and 120.

As shown, on the transparent second substrate 120, there are formed color filters 121 for implementing R, G and B colors and a black matrix 123 formed at the boundary among color filters 121 and blocking a portion of light transmitting through the liquid crystal layer 150. The color filter 121 can also be formed on the first substrate 110.

A method of fabricating the IPS mode LCD device with a high aperture ratio in accordance with the present invention will now be described with reference to the accompanying drawings.

Figure 4A:
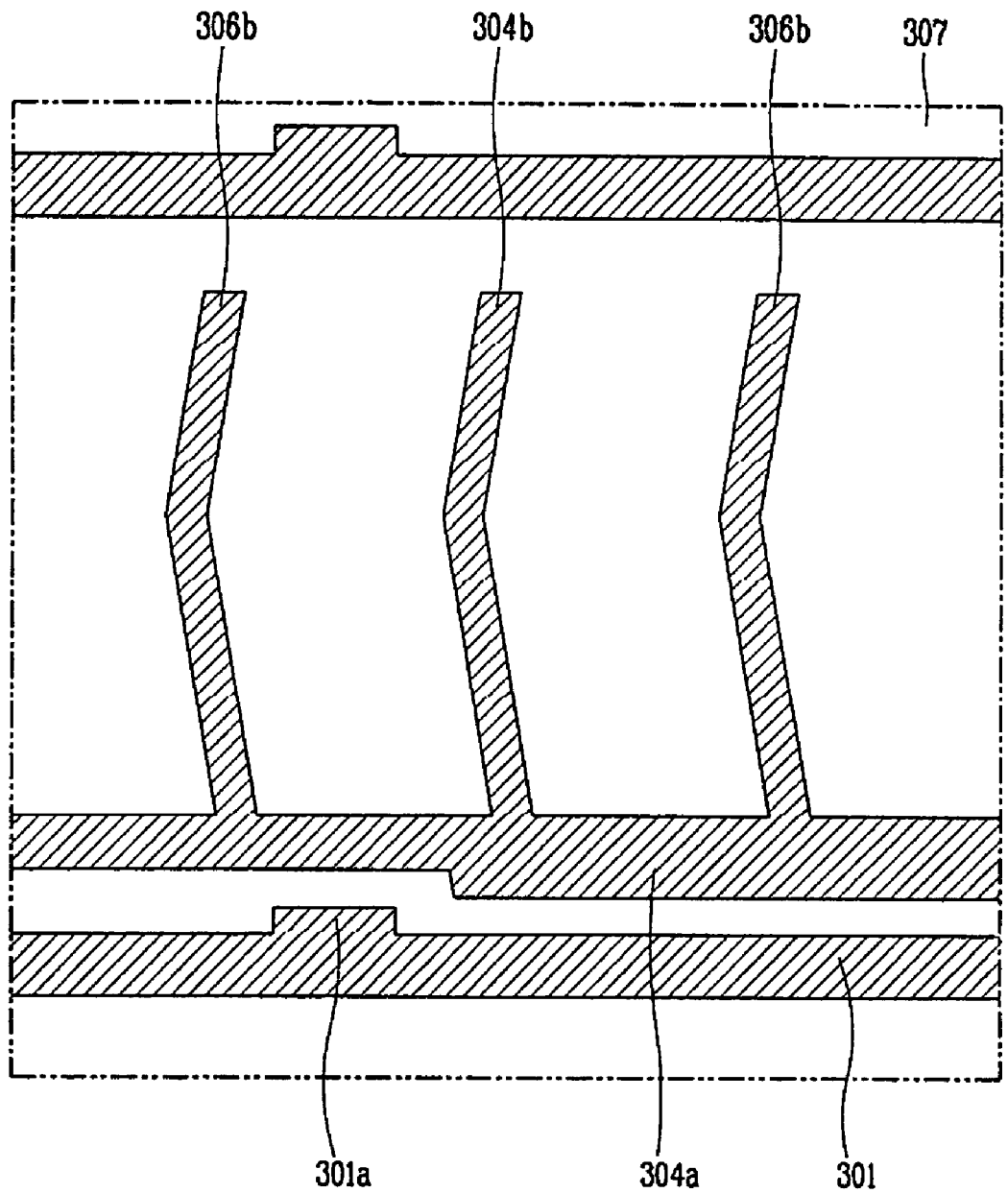
FIGS. 4A to 4C are plan views showing a sequential fabrication process of the IPS mode LCD device in accordance with the present invention.
Figure 4B:
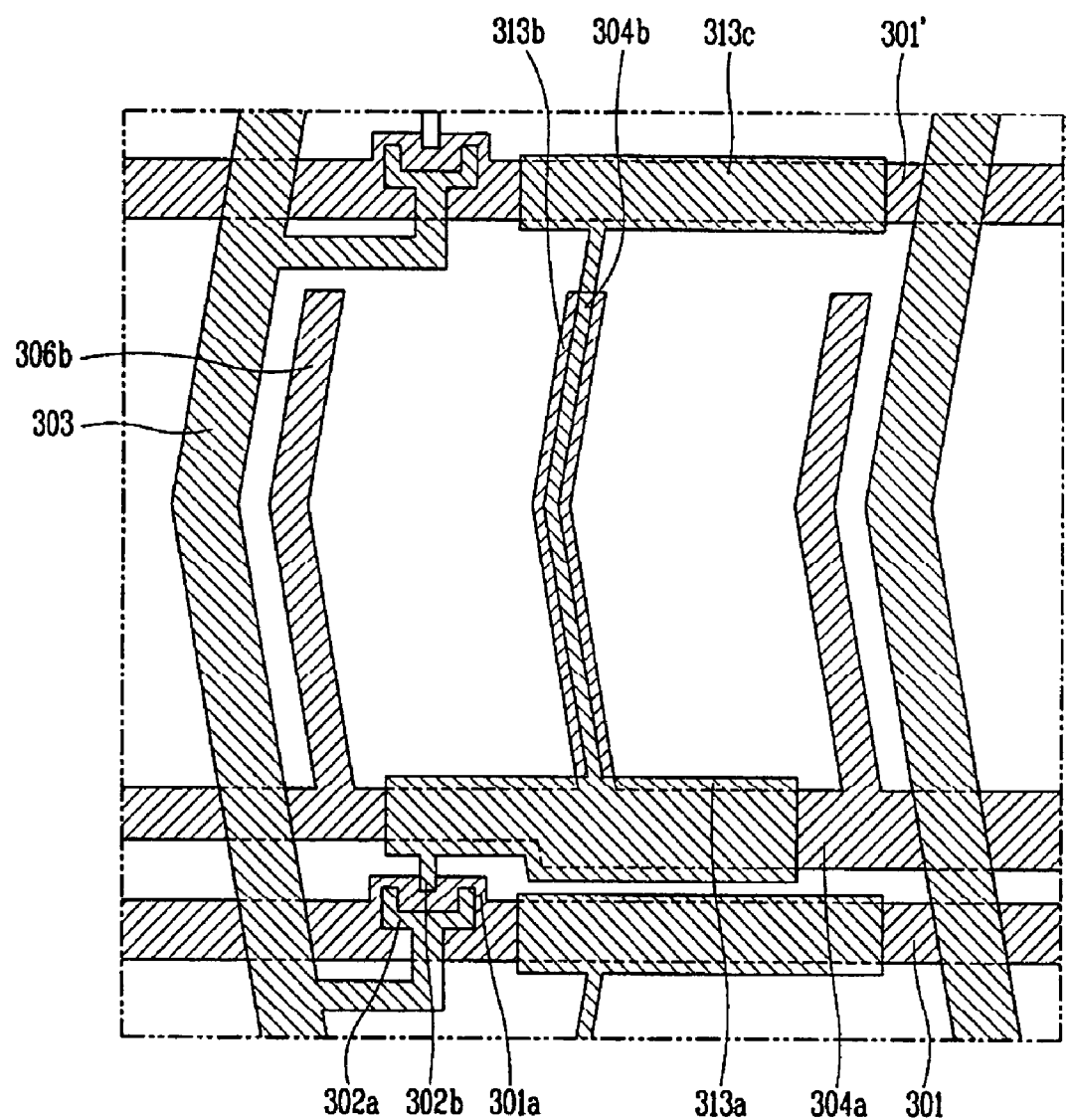
Figure 4C:
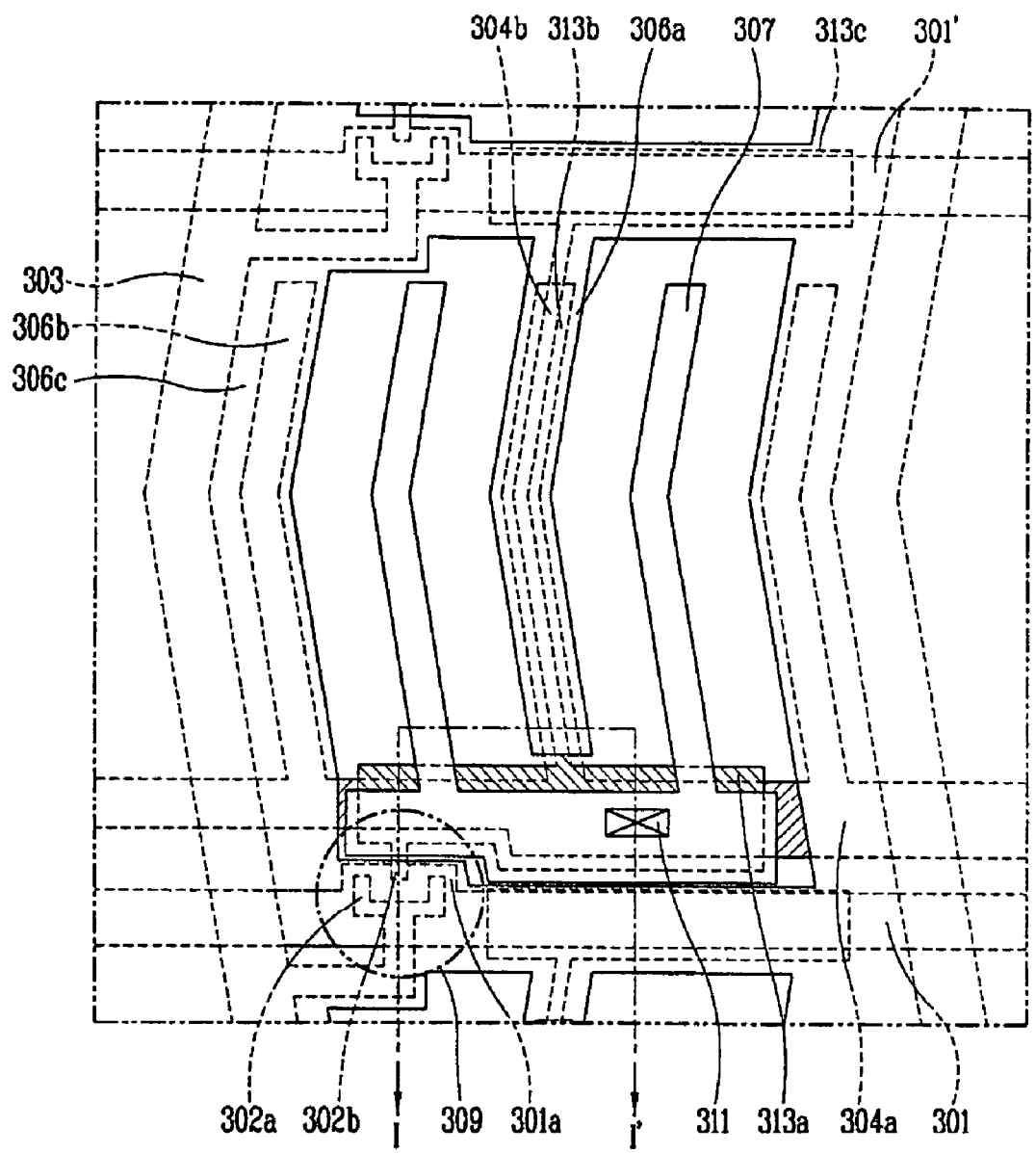

FIGS. 4A to 4C are plan views showing a sequential fabrication process of the IPS mode LCD device in accordance with the present invention.

As shown in FIG. 4A, a transparent first substrate 307 made of glass, quartz or the like is prepared, on which a first metallic material, such as molybdenum (Mo), a molybdenum alloy, aluminum (Al), an aluminum alloy, titanium (Ti), a titanium alloy, tantalum (Ta), a tantalum alloy, Cobalt, a cobalt alloy, nickel (Ni), a nickel alloy, Copper (Cu) or a copper alloy, is deposited.

Next, the resulting structure is patterned to form the gate line 301, the gate electrode 301a, the common line 304a and at least one metal layer 304b and shielding line 306b extending from the common line 304a. The metal layer 304b and the shielding line 306b are disposed to be substantially perpendicular to an extended direction of the gate line 301.

Next, an inorganic material such as SiNx (Silicon Nitride) or SiOx (Silicon Oxide) is deposited on the entire surface of the first substrate 307 including the gate line 301 and the common line 304a using a plasma CVD (Chemical Vapor Deposition) method to form a gate insulation film (not shown).

Thereafter, as shown in FIG. 4B, amorphous silicon and n+ amorphous silicon are sequentially deposited at an upper portion of the gate insulation film and then patterned to form a semiconductor layer (not shown) on the gate electrode 301a.

Subsequently, a second metal material, such as molybdenum (Mo), a molybdenum alloy, aluminum (Al), an aluminum alloy, titanium (Ti), a titanium alloy, tantalum (Ta), a tantalum alloy, cobalt, a cobalt alloy, nickel (Ni), a nickel alloy, copper (Cu) or a copper alloy, is deposited on the entire surface of the substrate including the semiconductor layer and then patterned to form a data line 303 defining a pixel region together with the gate line 301 and source and drain electrodes 302a and 302b disposed spaced apart from the semiconductor layer. In this case, a portion of the drain electrode 302b extends to an upper portion of the common line 304a to form a second storage electrode 313a. One side of the second storage electrode 313a extends to an upper portion of the metal layer 304b to form a first storage electrode 313b, and then, the first storage electrode 313b extends to overlap with an upper portion of the previous gate line 301' to form a third storage electrode 313c.

The first storage electrodes 313b are formed as many as the metal layers 304b so that they can correspond to each other.

Thereafter, a transparent organic material with a low dielectric constant such as an acrylic resin, a BCB (Benzocyclobutene) and a polyimide resin is coated on the entire surface of the substrate including the data line 303, the source and drain electrodes 302a and 302b, and the first to third storage electrodes 313b,313a and 313c, to form a passivation film (not shown).

Subsequently, as shown in FIG. 4C, the passivation film (not shown) is patterned to form a first contact hole 311 exposing one side of the drain electrode 302b or the second storage electrode 313a, and at the same time, to form a second contact hole (not shown) exposing a portion of the common line 304a to which a common signal of a pad terminal part (not shown) is applied.

And then, a transparent conductor such as ITO (Indium Tin Oxide), IZO (Indium Zinc Oxide), ITZO (Indium Tin Zinc Oxide) or TO (Tin Oxide) is deposited on the passivation film and then patterned to form a common electrode 306a and a pixel electrode 307 generating an in-plane electric field on the substrate, and a transparent conductor layer 306c extends from the common electrode 306a to cover the upper portion of the gate line 301, the data line 303, the switching device 309 and the shielding line 306b. In this case, the common electrode 306a and the pixel electrode 307 are formed at a certain region on the passivation film (not shown) corresponding to a first storage capacitor Cst1.

Through the above process, the array substrate of the IPS mode LCD device in accordance with the present invention is fabricated.

Additionally, though not shown, the method for fabricating the LCD device in accordance with the present invention includes: preparing a transparent second substrate; forming a black matrix and a color filer on the second substrate; and bonding the first and second substrates through the above-described process, and forming a liquid crystal layer at a space between the first and second substrates.

As so far described, the IPS mode LCD device with a high aperture ratio and its fabrication method in accordance with the present invention have many advantages.

For example, because the first storage capacitor is disposed at the lower end of the central portion of the common electrode and the pixel electrode, namely, the substantial light blocking region, reduction of the aperture ratio can be prevented while obtaining the same storage capacitance as that of the related art LCD device.

The first storage capacitor is not limited to necessarily being positioned at the lower end of the common electrode, and the number of first storage capacitors is not limited at its formation at the lower end of the pixel electrode. This can be possible because the passivation film with a low dielectric constant is disposed between the common electrode, the pixel electrode and the first storage capacitor to prevent generation of parasitic capacitance. In addition, the common electrode and the pixel electrode generating an in-plane electric field can be made of an opaque metal material, not the transparent conductor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display (LCD) device, comprising:
   first and second substrates;
   a plurality of gate lines and data lines arranged horizontally and vertically to define a plurality of pixel regions on the first substrate;
   a switching device, having a gate electrode, a semiconductor layer and source and drain electrodes, at each crossing of the gate lines and the data lines;
   a passivation film on an entire surface of the first substrate including the switching device;
   a common electrode and a pixel electrode arranged in an alternating pattern at an upper portion of the passivation film, wherein the pixel electrode is connected to the drain electrode to generate an in-plane electric field between the common and pixel electrodes by an signal from the drain electrode;
   at least one metal layer on a same layer as the gate line; and
   at least one first storage electrode on a same layer as the data line and overlapping the metal layer;
   a liquid crystal layer between the first and second substrates,
   wherein the metal layer and the first storage electrode are disposed below the common electrode so that the metal layer and the first storage electrode are entirely overlapped with the common electrode.

2. The device of claim 1, wherein the metal layer and the first storage electrode have a more narrow width than a width of the common electrode and the pixel electrode.

3. The device of claim 1, further comprising:
   a second storage capacitor comprising:
   a common line on a same layer as the gate line and receiving a common signal; and
   a second storage electrode extending from the drain electrode and overlapping the common line.

4. The device of claim 3, wherein the first storage electrode extends from the second storage electrode.

5. The device of claim 3, further comprising:
   a shielding line extending other sides of the common line along outer edges of the pixel region to prevent an influence of a data signal on the pixel electrode.

6. The device of claim 1, further comprising:
   a third storage capacitor comprising:
   a gate line of a neighboring pixel; and
   a third storage electrode electrically connected to the drain electrode and overlapping the gate line.

7. The device of claim 6, wherein the third storage electrode extends from the first storage electrode.

8. The device of claim 1, wherein the common electrode and the pixel electrode are a transparent conductor layer selected from a group consisting of ITO (Indium Tin Oxide), IZO (Indium Zinc Oxide), ITZO (Indium Tin Zinc Oxide) or TO (Tin Oxide).

9. The device of claim 8, wherein the transparent conductor layer extends from the common electrode and is formed at an upper portion of the gate line, the data line and the switching device.

10. The device of claim 1, wherein the common electrode and the pixel electrode are an opaque metal layer.

11. The device of claim 1, further comprising:
    a first contact hole electrically connecting the drain electrode or the second storage electrode extending from the drain electrode and one side of the pixel electrode; and
    a second contact hole transferring an electrical signal of the common line to the common electrode.

12. The device of claim 11, wherein the second contact hole is formed at a pad terminal part.

13. The device of claim 1, wherein the common electrode and the pixel electrode have bent structure.

14. The device of claim 13, wherein the data line has a bent structure substantially parallel to the common electrode and the pixel electrode.

15. The device of claim 1, wherein the passivation film is one of transparent organic insulation films having a low dielectric constant selected from the group consisting of acrylic resin, BCB (Benzocyclobutene) and a polyimide resin.

16. The device of claim 1, further comprising:
    color filters on the second substrate; and
    a black matrix at a boundary between the color filters.

17. A method for fabricating an in-plane switching (IPS) mode liquid crystal display (LCD) device, comprising:
    preparing first and second substrates;
    forming at least one first storage capacitor on the first substrate;
    forming a passivation film on the first substrate with at least one storage capacitor formed thereon;
    forming a common electrode and a pixel electrode at a region on the passivation film corresponding to the storage capacitor, the pixel electrode being connected to the drain electrode to generate an in-plane electric field between the common and pixel electrodes by an signal from the drain electrode; and
    forming a liquid crystal layer between the first and second substrates,
    wherein the storage capacitor includes at least one metal layer on a same layer as the gate line and at least one first storage electrode on a same layer as the data line and overlapping the metal layer, the metal layer and the first storage electrode are disposed below the common electrode so that the metal layer and the storage electrode are entirely overlapped with the common electrode.

18. The method of claim 17, wherein forming the at least one storage capacitor comprises:
    forming at least one metal layer on the first substrate;
    forming a gate insulation film on the first substrate including the at least one metal layer; and
    forming a first storage electrode on the gate insulation film.

* * * * *